(12) United States Patent
Kobayashi et al.

(10) Patent No.: US 7,461,227 B2
(45) Date of Patent: Dec. 2, 2008

(54) STORAGE SYSTEM AND DATA BACKUP METHOD FOR THE SAME

(75) Inventors: Naotaka Kobayashi, Odawara (JP); Shizuo Yokohata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/972,100

(22) Filed: Jan. 10, 2008

(65) Prior Publication Data

US 2008/0120483 A1 May 22, 2008

Related U.S. Application Data

(63) Continuation of application No. 11/016,105, filed on Dec. 17, 2004, now Pat. No. 7,334,100, which is a continuation of application No. 10/427,689, filed on Apr. 29, 2003, now Pat. No. 6,886,086.

(30) Foreign Application Priority Data

Dec. 26, 2002 (JP) ............................ 2002-375857

(51) Int. Cl.
*G06F 12/00* (2006.01)

(52) U.S. Cl. ...................... 711/162; 711/161

(58) Field of Classification Search .................. None
See application file for complete search history.

(56) References Cited

U.S. PATENT DOCUMENTS

| 5,832,222 A | 11/1998 | Dziadosz et al. |
| 5,896,516 A | 4/1999 | Powell et al. |
| 5,906,658 A | 5/1999 | Raz |
| 5,907,684 A | 5/1999 | Halma et al. |
| 6,006,342 A | 12/1999 | Beardsley et al. |
| 6,078,990 A | 6/2000 | Frazier et al. |

(Continued)

FOREIGN PATENT DOCUMENTS

JP 2002-007304 1/2002

OTHER PUBLICATIONS

Liu et al. "Design and Evaluation of a Generic Software Architecture for On-Demand Video Servers," IEEE Transactions on Knowledge and Data Engineering 11:406-424 (1999).

*Primary Examiner*—Than Nguyen
(74) *Attorney, Agent, or Firm*—Townsend and Townsend and Crew LLP

(57) ABSTRACT

A storage system includes a network adapter, a channel adapter, a shared memory, a cache memory, a disk adapter, a switch and a storage device. The storage device stores data. The network adapter includes a port connected to a local area network, and a NAS processor and an I/O processor. The NAS processor receives a file access request via the port, and gives instructions to access the data stored in the storage device as well as instructions to back up the data stored in the storage device. The I/O processor transfers access to the data stored in the storage device to the cache memory, and transfers backup instructions for the data stored in the storage device to the shared memory. The channel adapter includes a port and an I/O processor. The I/O processor sends out data stored in the storage device to the device storing backup data, in response to a backup instruction from the network adapter.

22 Claims, 11 Drawing Sheets

U.S. PATENT DOCUMENTS

| | | |
|---|---|---|
| 6,101,547 A | 8/2000 | Mukherjee et al. |
| 6,105,122 A | 8/2000 | Muller et al. |
| 6,108,704 A | 8/2000 | Hutton et al. |
| 6,173,374 B1 | 1/2001 | Heil et al. |
| 6,273,622 B1 | 8/2001 | Ben-David |
| 6,438,586 B1 | 8/2002 | Hass et al. |
| 6,513,097 B1 | 1/2003 | Beardsley et al. |
| 6,725,293 B1 | 4/2004 | Nakayama et al. |
| 6,728,850 B2 | 4/2004 | Gotoh et al. |
| 6,810,462 B2 | 10/2004 | Matsunami et al. |
| 6,839,747 B1 | 1/2005 | Blumenau et al. |
| 6,886,086 B2 | 4/2005 | Kobayashi et al. |
| 7,139,885 B2 * | 11/2006 | Yamagami ................ 711/162 |
| 7,152,078 B2 * | 12/2006 | Yamagami ................ 707/204 |
| 7,152,144 B2 | 12/2006 | Fujita et al. |

\* cited by examiner

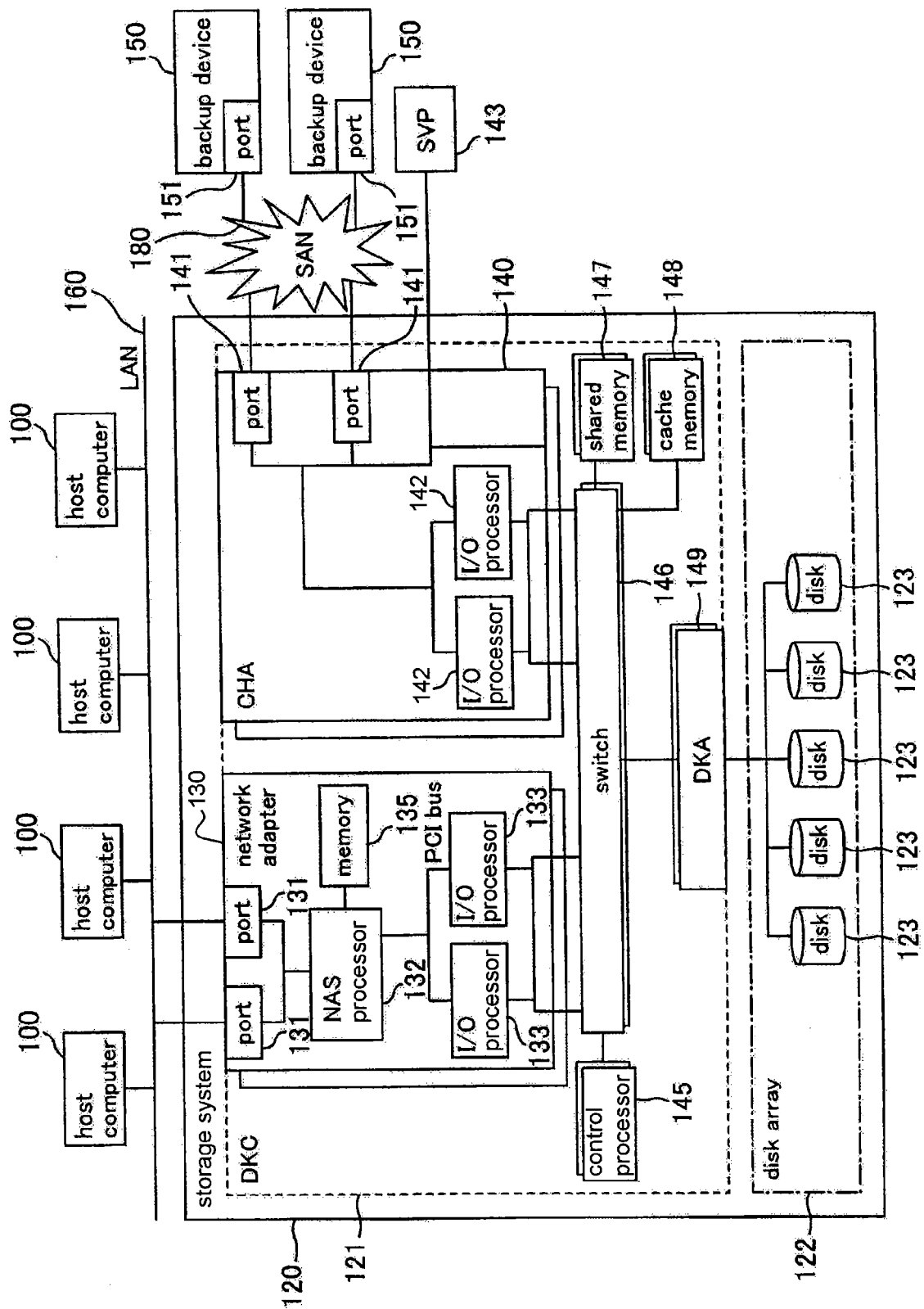
[Fig.1]

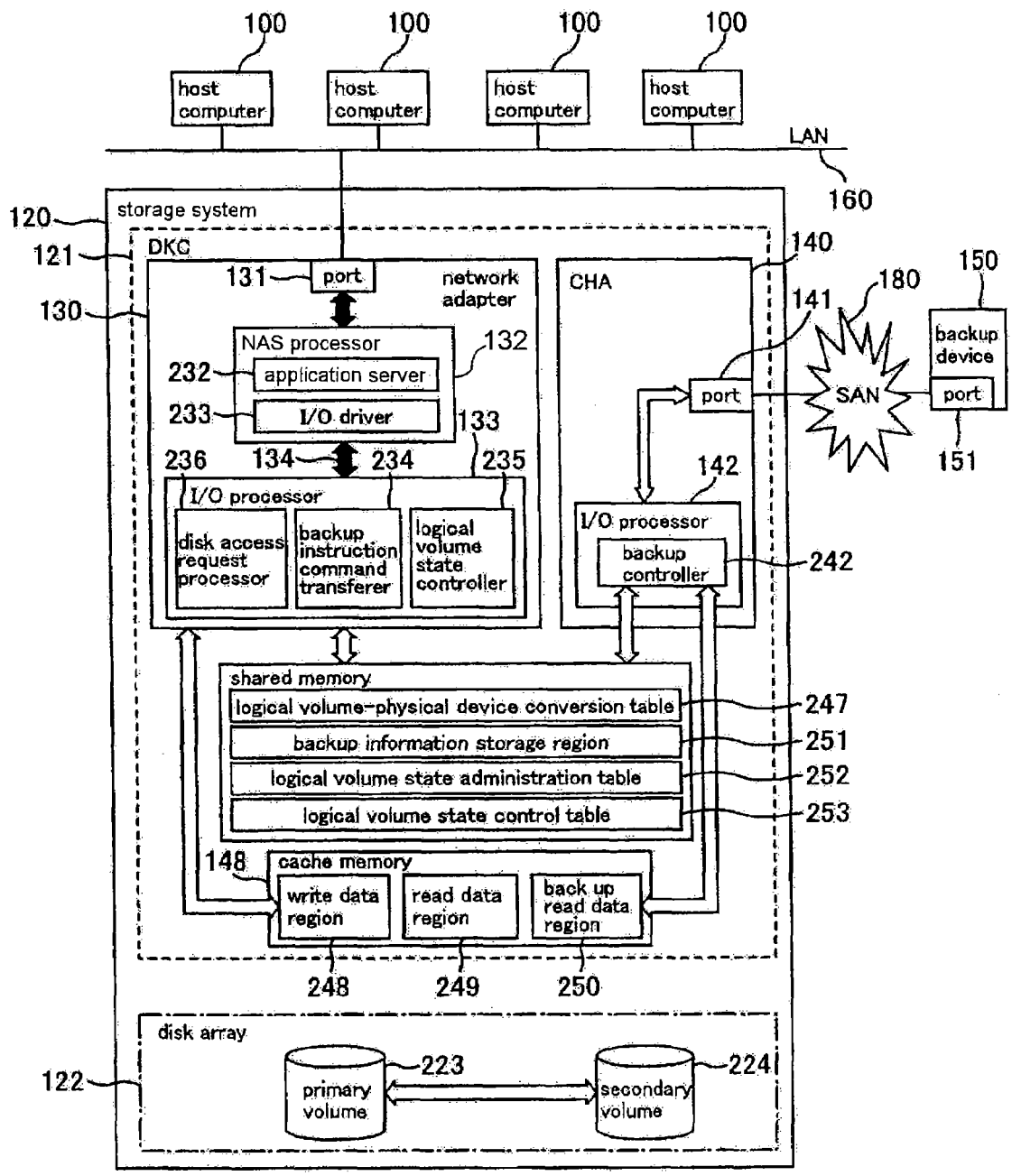
[Fig.2]

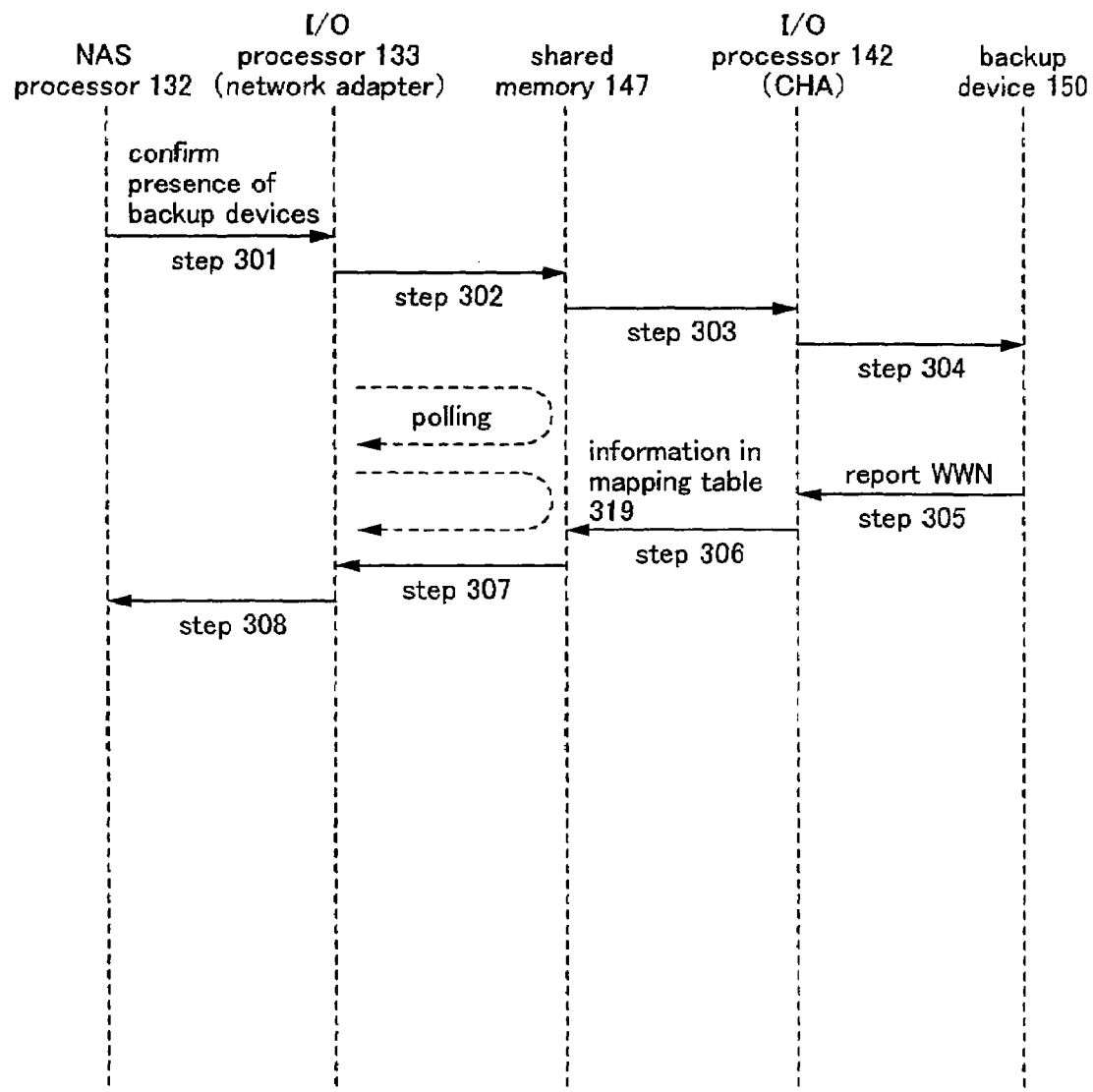
[Fig.3]

mapping table 402
(network adapter)

| # | initiator port # | target port # | back up device WWN |
|---|---|---|---|
| 1 | A | 00 | XX······XX |
| 2 | B | 01 | YY······YY |
| ⋮ | ⋮ | ⋮ | ⋮ | mapping table 401
(CHA)

| # | initiator port # | target port # | back up device WWN |
|---|---|---|---|
| 1 | A | 00 | XX······XX |
| 2 | B | 01 | YY······YY |
| ⋮ | ⋮ | ⋮ | ⋮ |

【Fig.4】

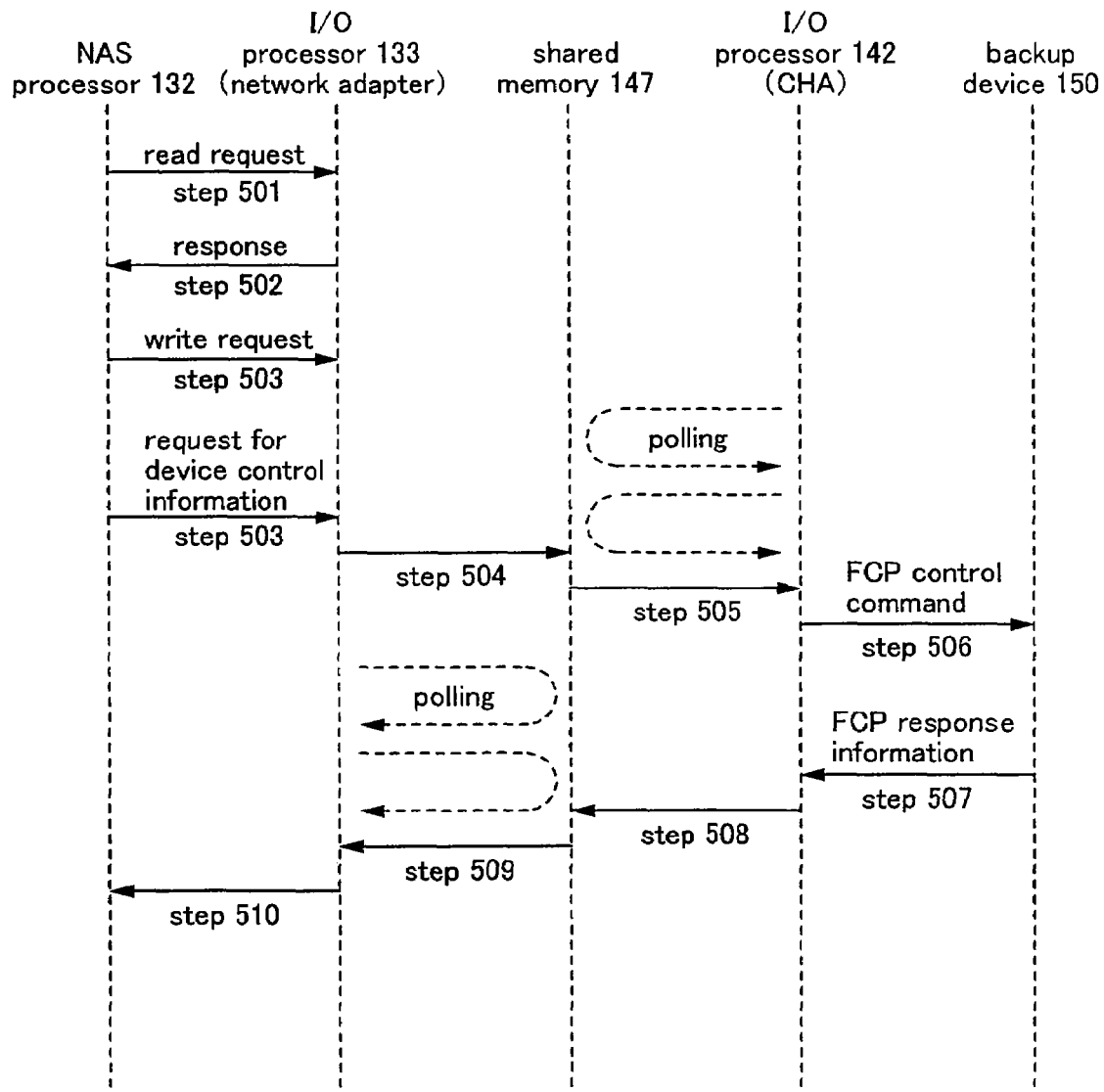
[Fig.5]

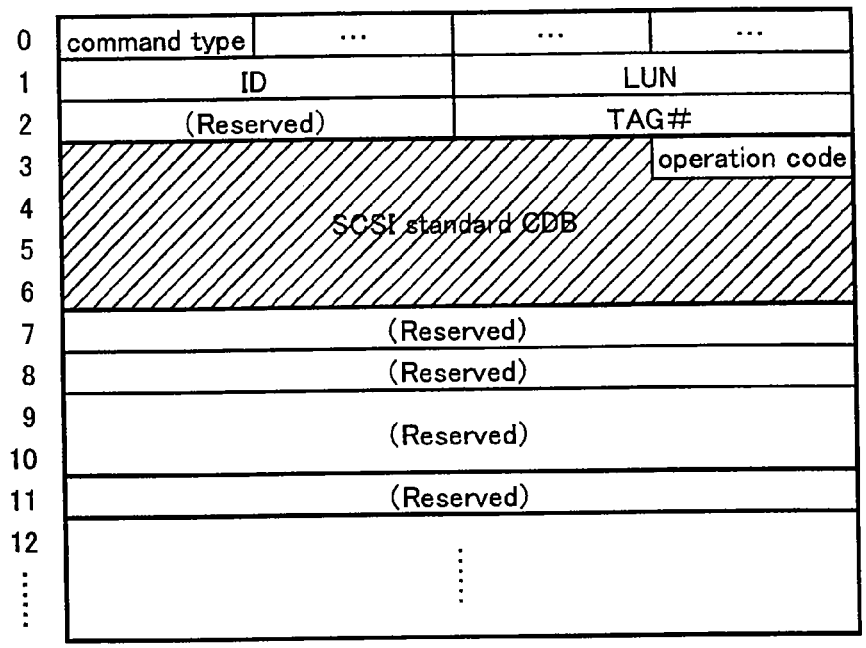
【Fig.6】
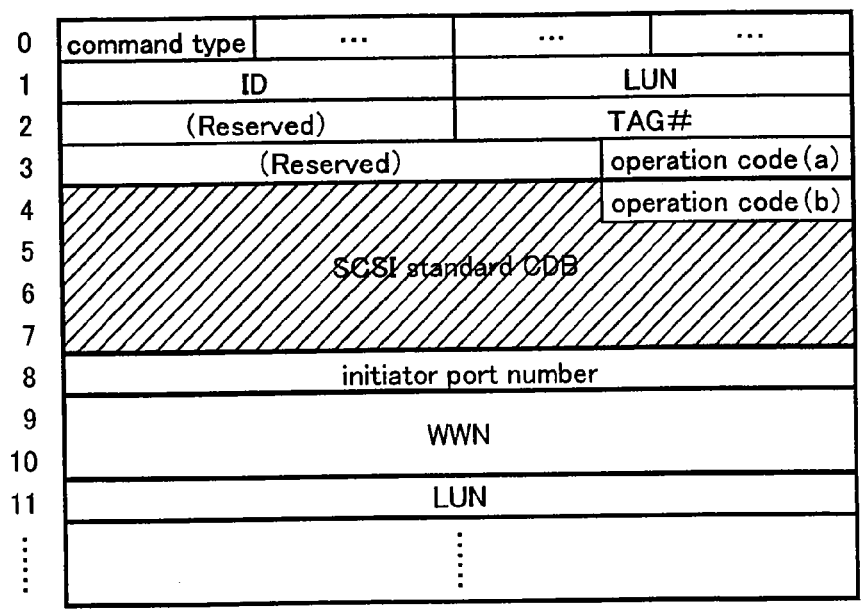
【Fig.7】

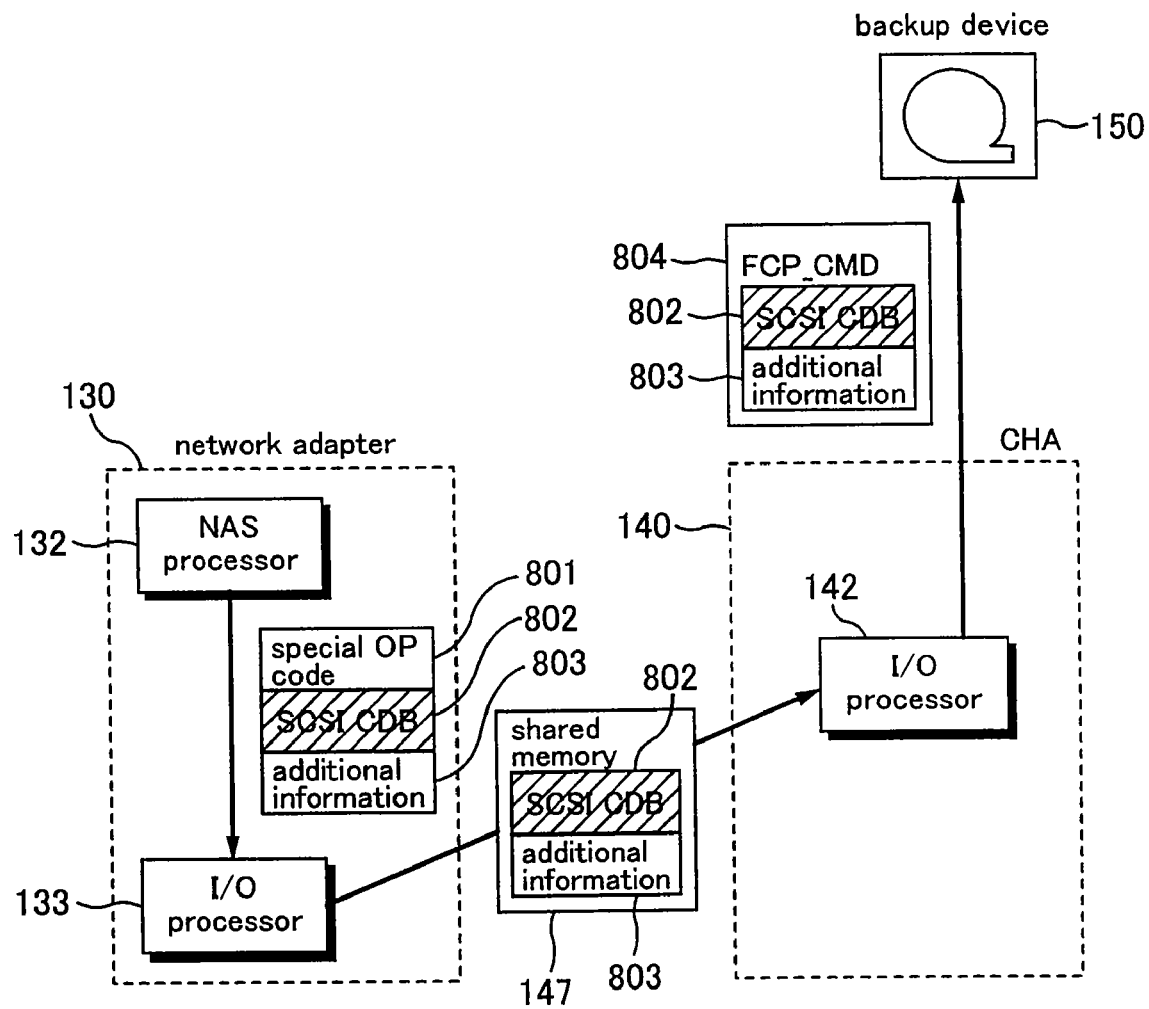
[Fig.8]

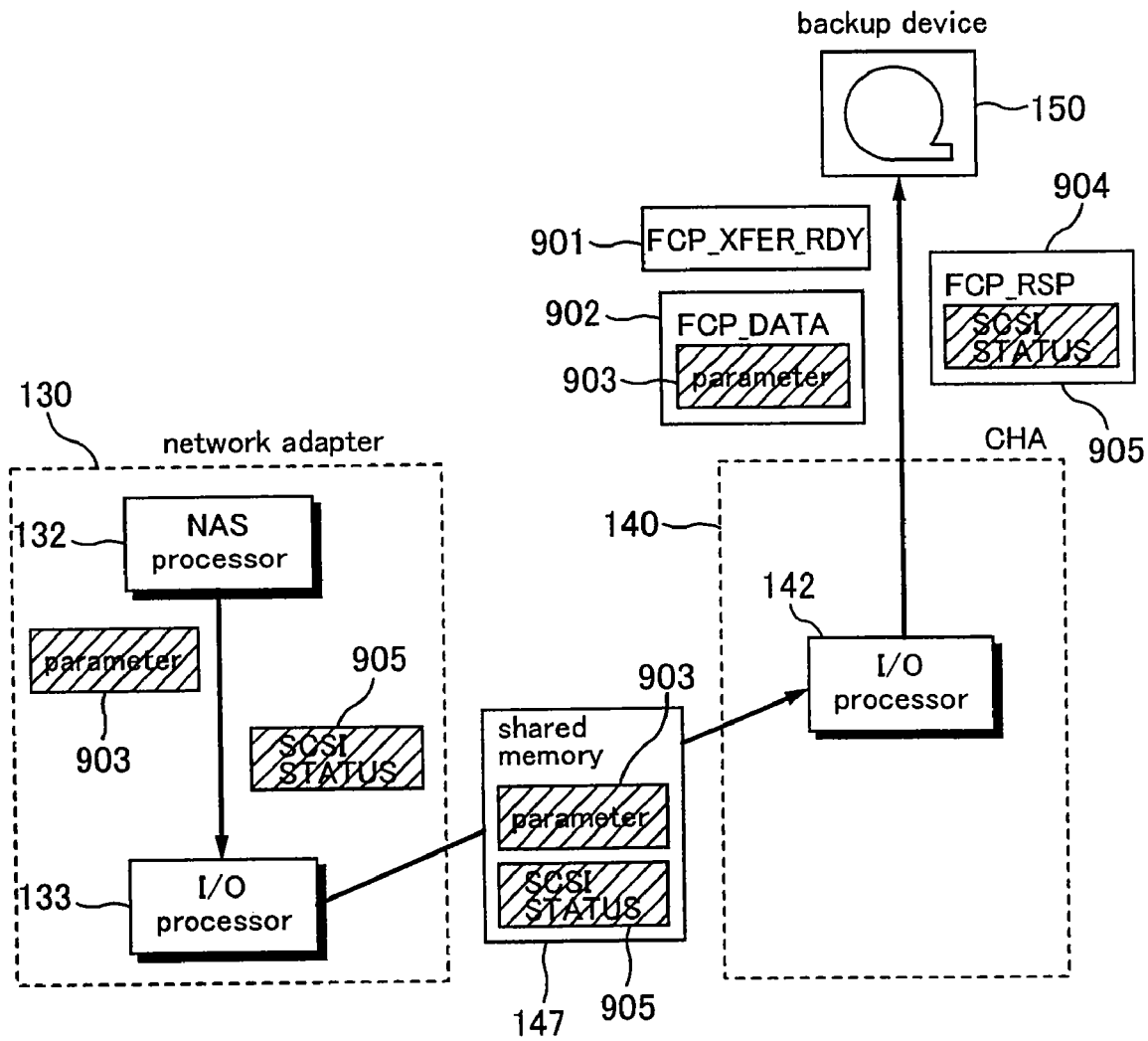
[Fig.9]

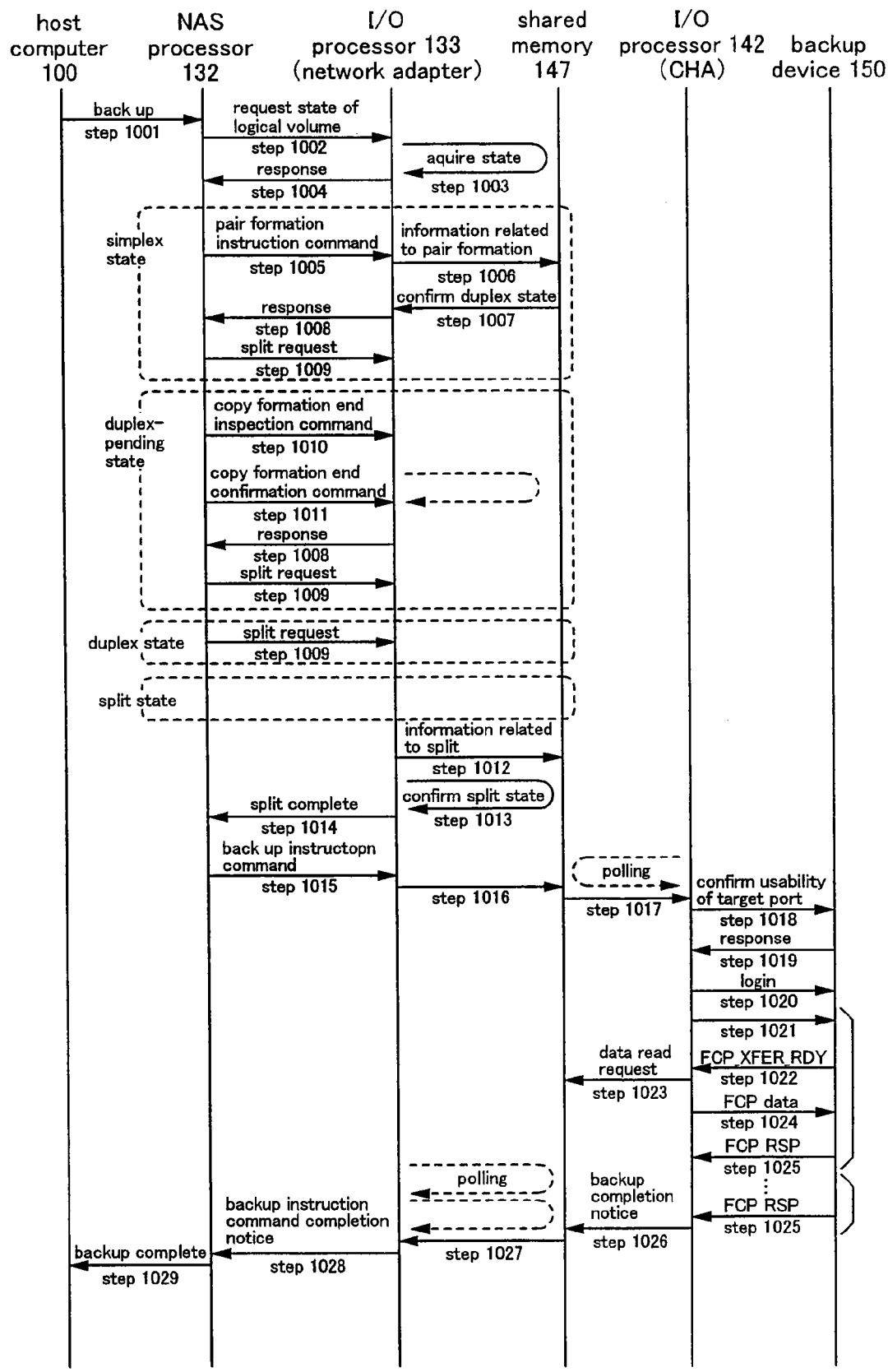
[Fig.10]

| byte | |
|---|---|
| 0 | operation code (83h) |
| 1 | reserved |
| 2 | reserved |
| 3 | reserved |
| 4 | reserved |
| 5 | reserved |
| 6 | reserved |
| 7 | reserved |
| 8 | reserved |
| 9 | reserved |
| 10 | parameter length |
| 11 | |
| 12 | |
| 13 | |
| 14 | reserved |
| 15 | control |

[Fig.11]

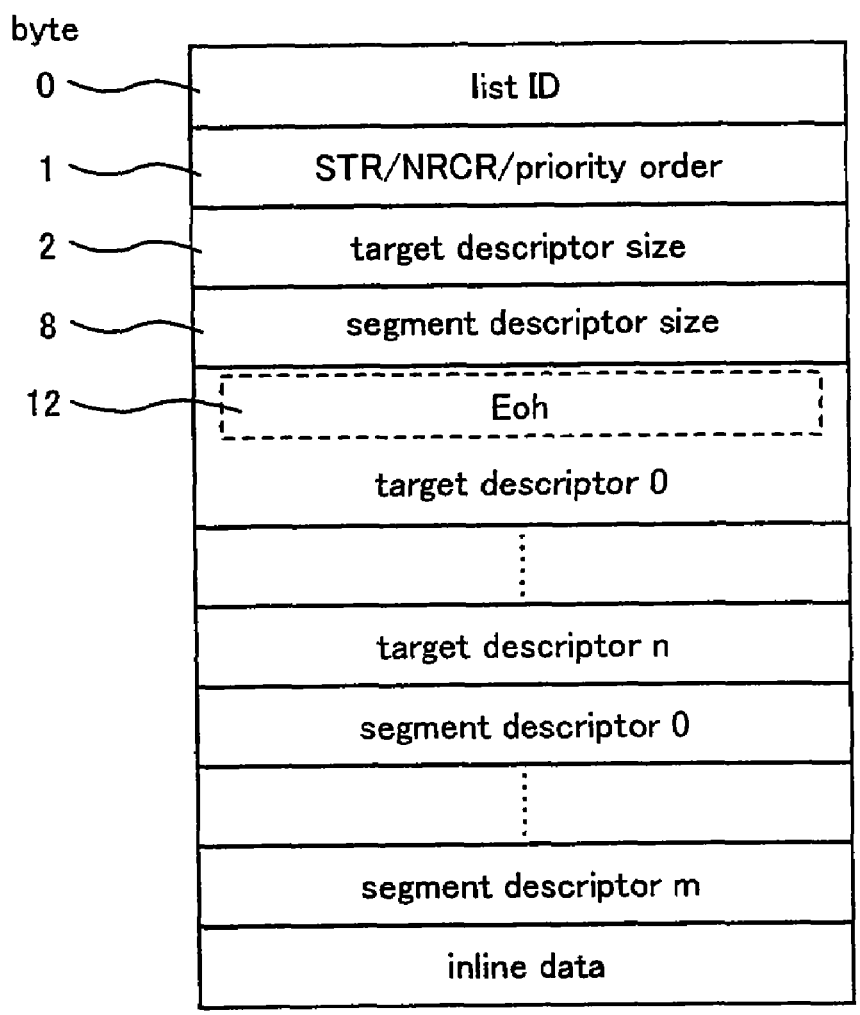
[Fig.12]

STORAGE SYSTEM AND DATA BACKUP METHOD FOR THE SAME

CROSS-REFERENCE TO RELATED APPLICATIONS

The present application claims priority upon Japanese Patent Application No. 2002-375857 filed on Dec. 26, 2002, which is herein incorporated by reference.

FIELD OF THE INVENTION

The present invention relates to backup of information stored in a storage system, and more particularly to backup control of a storage system having a backup function.

BACKGROUND OF THE INVENTION

Recently, NAS (network attached storages) have received attention as one type of storage systems that are installed in data centers or the like. A NAS is configured using an application server, which is provided on the same LAN (local area network) as a host computer, and a storage system that is connected subordinately to the application server. The application server accepts file access requests by file designations received from the host computer via the LAN, and sends disk access requests to a subordinate storage system. The storage system carries out the reading or writing of data in response to the disk access requests from the application server. It is noted that a "file access request" means a read request, a write request, or any other request of this kind that is carried out through a file system.

For the backup of data with a NAS, a backup server different from the application server is provided on the LAN. The backup server reads out backup data via the LAN from the storage system subordinate to the application server, and backs up the data in a backup device, such as a tape library. Furthermore, by providing the storage system with a function for writing to the backup device, a method for backing up data from the storage system without using a backup server has also been contrived.

However, in backup methods in which a backup server is not utilized, the application server is no longer able to obtain device control information from the backup server. It should be noted that what is here referred to as device control information may be characteristic information about the backup device or information about storage capacity, for example.

Furthermore, if the storage system is provided with a function for writing to the backup device, then this may influence the routine processing of the storage system. This influence on the routine processing becomes larger as the amount of data that is backed up onto the backup device becomes larger or as the number of backup devices to back up on becomes larger and then the speed of the routine processing may become sluggish. It should be noted that what is referred to as routine processing here may be, for example, writing or reading data that are processed in response to a disk access request from the application server. It is also noted that a "disk access request" means a read request, a write request, or any other request of this kind that is carried out without utilizing a file system.

SUMMARY OF THE INVENTION

Consequently, the present invention is directed to make it possible that in the backup of data to a backup device, such as a tape library, information about the backup device can be obtained efficiently, and to make an efficient and speedy backup in the storage system possible.

The storage system includes a network adapter, a channel adapter, a first memory, a second memory, a disk adapter, a connection mechanism and a storage device. The storage device stores data. The network adapter includes a first port connected to a communication path such as a local area network, and a first processor and a second processor. The first processor receives a file access request via the first port, and gives instructions to access the data stored in the storage device as well as instructions to back up the data stored in the storage device. The second processor transfers access to the data stored in the storage device to the second memory, and transfers backup instructions for the data stored in the storage device to the first memory. The channel adapter includes a second port and a second processor. The second port is connected to a device storing backup data. The second processor sends out data stored in the storage device via the second port to the device storing backup data, in response to a backup instruction from the first processor. The first memory stores information that is sent from the network adaptor and the channel adapter. The second memory stores data when accessing data stored in the storage device from the network adapter. The disk adapter accesses data stored in the storage device. The connection mechanism connects the network adapter, the channel adapter, the first memory, the second memory and the disk adapter.

Furthermore, the network adapter requests confirmation that devices storing the backup data are connected to the channel adapter or requests structural information about the devices storing backup data.

In accordance with the present invention, the backup of data to the backup devices becomes efficient and fast.

BRIEF DESCRIPTION OF THE DRAWINGS

Preferred embodiments of the present invention will now be described in conjunction with the accompanying drawings, in which:

FIG. 1 shows the overall configuration of a network system in accordance with a working example.

FIG. 2 is a diagram that functionally illustrates the processes of the storage system in this working example.

FIG. 3 shows the procedural flow with which the storage system of this working example obtains structural information regarding the backup devices.

FIG. 4 shows a mapping table that has been generated through the procedural flow of FIG. 3.

FIG. 5 shows the procedural flow of the various elements in the storage system for a data input/output request or control command that is sent out by the NAS processor in the storage system.

FIG. 6 is an example of a format for an access request to a logical volume that is sent out by the NAS processor in the storage system.

FIG. 7 shows an example of the format of a control command for requesting device control information that is sent out from the NAS processor in the storage system.

FIG. 8 shows the flow of control commands sent out from the NAS processor in the storage system until the commands are received by the backup devices.

FIG. 9 shows the flow of device control information sent out from the backup device until the device control information is received by the NAS processor in the storage system.

FIG. 10 shows the procedural flow when storing data in the storage system in the backup devices.

FIG. 11 is an example of a backup instruction command that is sent out after it has been generated by the NAS processor in the storage system.

FIG. 12 is an example of the parameter list that follows the backup instruction command of FIG. 11.

DESCRIPTION OF THE PREFERRED EMBODIMENTS

The following is a detailed description of embodiment of the present invention, with reference to the drawings.

FIG. 1 shows the overall configuration of a network system in accordance with a working example. The following is a description of the network system and the devices constituting the network system.

The network system includes a plurality of host computers 100, a storage system 120 and a plurality of backup devices 150. The plurality of host computers 100 and the storage system 120 are connected by a LAN 160. The storage system 120 and the plurality of backup devices 150 are connected by a SAN (storage area network) 180.

The host computers 100 are computers, information processing devices or the like, that execute an operating system and applications with a CPU (central processing unit). In this working example, the host computers 100 send out file access requests by file designations to the storage system 120, and are, for example, mainframes, or servers or work stations running a UNIX (trademark by X/Open Corp.) type operating system, or servers or PCs (personal computers) running a Windows (trademark by Microsoft Corp.) type operating system.

The backup devices 150 are devices on which the data of the storage system 120 are stored for backup, and are, for example, a magnetic tape library, a RAID (redundant arrays of inexpensive disks) type library/library array, or a DVD-RAM library/library array. The plurality of backup devices 150 are each provided with a port 151, and are connected to the SAN 180 via that port 151.

The SAN 180 is configured using FC (Fibre Channel) switches or the like, and communication on it is carried out using FCP (Fibre Channel Protocol).

The storage system 120 is a system for writing or reading data or programs on a disk array 122 serving as a storage device, in response to requests from the host computers 100. In this working example, the storage system 120 receives file access requests by file designations from the host computers 100, and stores them on a disk in the same system, or copies the data that are stored on the disks in the same system onto a backup device 140.

The storage system 120 includes a DKC (disk controller) 121 and a plurality of disk arrays 122. The DKC 121 includes a network adapter 130, a CHA (channel adapter) 140, an SVP (service processor) 143, a control processor 145, a switch 146, a shared memory 147, a cache memory 148, and a DKA (disk adapter) 149. The control processor 145 manages the state of the DKC 121, and, by controlling the switch 146, controls the exchange of information or data between the devices constituting the DKC 121. Under the control of the control processor 145, the switch 146 performs with high speed the exchange of information among the control processor 145, the shared memory 147, the cache memory 148 and the DKA (disk adapter) 149. The shared memory 147 is a volatile or a non-volatile memory storing mainly control information, and the cache memory 148 is a volatile or a non-volatile memory storing mainly write data or read data. The DKA 149 accesses the disk drives 123 in the disk array 122 and writes or reads out data. The SVP 143 is a device that is used by a user or an administrator of the storage system 120 to monitor and manage the state of the storage system 120, and may be, for example, a PC or the like. It should be noted that in this working example, the devices constituting the DKC 121 are connected using the switch 146, but the present invention is not limited to this example, and it is also preferable to connect them using a bus, a LAN or other network, or an InfiniBand or other interface.

The disk array 122 includes a plurality of disk drives 123. The disk array 122 may include all disk drives 123 in one casing, but it may also include the plurality of disk drives 123 distributed over a plurality of casings. It should be noted that the following concepts can be listed with regard to the disk array 122. One principle of the storage system 120 has a concept of "logical volumes" as the units in which data or programs are stored. A logical volume is a logical unit that is different from the individual disk drives 123. More specifically, a logical volume is a logical administrative unit for storing data or programs. One disk drive 123 may be allocated as one logical volume, a plurality of disk drives 123 may be allocated as one logical volume, one disk drive 123 may be allocated as a plurality of logical volumes, or a plurality of disk drives 123 may be allocated as a plurality of logical volumes. Each logical volume has a LUN (logical unit number) as an identifier for identifying the logical volumes, and access from the DKA 149 is carried out using the LUN. Consequently, the DKA 149 accesses the disk drives 123 and writes or reads data, but speaking more precisely, the DKA 149 accesses the data in the disk array 122 in units of logical volumes, in response to an instruction from the network adapter 130.

The network adapter 130 and the CHA 140 are configured by one circuit board or one module each, and each adapter can be plugged individually into the storage system 120. By making the configuration with which the network adapter 130 and the CHA 140 are connected to the storage system 120 similarly, the user can select a network adapter 130 or CHA 140 as necessary, and plug it into the storage system 120 as desired. Furthermore, by making it possible to connect a plurality of network adapters 130 and CHAs 140 to the storage system, the user can freely select the number of network adapters 130 and CHAs 140. In this case, a plurality of network adapters 130 and CHAs 140 are respectively provided in the DKC 121 and a redundant configuration is established so that they can handle various kinds of defects. Similarly, the control processor 145, the switch 146, the shared memory 147, the cache memory 148 and the DKA 149 are all provided in plurality in the DKC 121. Moreover, also the DKC 121 is provided in plurality in the storage system, thus establishing a redundant configuration.

With this working example, by providing the network adaptor 130 and the CHA 140 in the storage system 120, a storage system can be realized that is connected to different kinds of networks. More specifically, the storage system 120 is a SAN-NAS integrated storage system that is connected to a NAS using the network adapter 130 and connected to a SAN using the CHA 140.

The network adaptor 130 has a plurality of ports 131, a NAS processor 132, a plurality of I/O processors 133 and a memory 135. The plurality of ports 131 are connected to a LAN 160 that is outside the storage system 120, and exchange information or data with the host computers 100. Via the ports 131, the NAS processor 132 exchanges information or data with the host computers 100 using a file sharing protocol, such as NFS (network file system) or CIFS (common internet file system), and TCP/IP (transmission control protocol/internet protocol). It should be noted that NFS is a file sharing protocol that is used mainly on UNIX-based operating systems, whereas CIFS is a file sharing protocol that is mainly used on Windows-based operating systems.

In this working example, in addition to the above-mentioned processes, the NAS processor 132 executes (1) the conversion between data in file units (referred to as file data below) that are accessed from the host computers 100 and data included in a logical volume, (2) the creation and sending of control commands addressed to the backup devices 150, (3) the receiving of device control information sent from the backup devices 150, (4) instructing the pairing and unpairing of logical volumes in the disk array 122, and (5) the creation and sending of backup instruction commands.

Since the network adapter 130 is configured as one modular boards as mentioned above, the NAS processor 132 and the I/O processors 133 can be connected via a bus, such as a PCI (peripheral component interconnect) bus 134. Thus, not only the use of vendor-unique commands, but also high-speed processing becomes possible. It should be noted that it is also preferable that the vendor-unique commands are commands in accordance with SCSI (small computer system interface), for example.

The I/O processors 133 exchange control information or data with the NAS processor 132 using SCSI, and execute the writing and reading of data on the disk array 122 upon receiving disk access requests from the NAS processor 132. In this working example, in addition to the above-mentioned processes, the I/O processors 133 execute the processes necessary for (1) the transfer of control commands sent out from the NAS processor 132 and addressed to the backup devices 150, (2) the transfer of device control information sent out from the backup devices 150 and addressed to the NAS processor 132, (3) the controlling of the pairing and unpairing of logical volumes in the disk array 122 in response to instructions from the NAS processor 132, and (4) the backup of data as the target, when receiving a backup instruction command from the NAS processor 132.

The memory 135 functions as a local memory of the NAS processor 132, and stores various kinds of control information, for example, position information of data stored in the disk drives 123 of the disk array 122, information about the data included in the logical volumes, or information about the correlation between file data and data stored on the disk drives 123, or about the correlation between the data included in the logical volumes and the file data. This control information is used, for example, for the conversion between file data and data included in the logical volumes with the NAS processor 132, or for requests of pair formation or splitting, which is explained later.

The CHA 140 includes ports 141 and a plurality of I/O processors 142. The plurality of ports 141 are respectively connected to the SAN 180 or the SVP 143, which are outside the storage system 120, and exchange information or data with the backup devices 150 or the SVP 143. The I/O processors 142 exchange control information or data via the ports 141 with the backup devices 150, using FCP. It should be noted that the ports 141 and the I/O processors 142 are connected by a bus, such as a PCI bus. In this working example, the SVP 143 is connected via a port 141 to the CHA 140, but the present invention is not limited to this example, and it is also preferable that it is connected to the network adaptors 130, the CHA 140 and other internal devices of the storage system using a bus, a LAN or another network.

In this working example, in addition to the above-mentioned processes, the I/O processors 142 execute the processing necessary for (1) the transfer of control commands that are sent out from the NAS processor 132 in the network adapter 130 and addressed to the backup devices 150, (2) the transfer of device control information that is sent out from the backup devices 150 and addressed to the NAS processor 132 in the network adapter 130, and (3) the backup of data as the initiator, when receiving a backup instruction command sent out from the NAS processor 132 in the network adaptor 130.

In this working example, by providing a CHA 140 dedicated to backup processing separately from the network adaptor 130, it is possible to handle the backup of data while suppressing the influence on routine processing in the storage system.

FIG. 2 is a diagram that functionally illustrates the processes of the storage system in this working example. The following is a functional explanation of the processes of the storage system constituting the network system. It should be noted that, for illustrative reasons, FIG. 2 singles out certain devices shown in FIG. 1, but this working example is not necessarily limited to those parts.

The NAS processor 132 in the network adaptors includes an application server 232 and an I/O driver 233. The application server 232 has the function of an administration server, a file server and a backup server or the like, and more specifically handles (1) the control of file sharing protocols, such as NFS or CIFS, and TCP/IP, (2) the analysis of file access requests for designated files, the access to control information in the memory 135, the conversion between file data and logical volumes in the disk array 122, using a conversion table (not shown), and the creation of requests for access to the logical volumes in the disk array 122, (3) the creation of control commands addressed to the backup devices 150, (4) the administration of device control information regarding the backup devices 150, (5) the creation of instruction commands for the pairing and unpairing of logical volumes in the disk array 122, and (6) the creation of backup instruction commands. It should be noted that, with regard to high processing speed, it is preferable that the conversion table for conversion between the file data and the logical volumes in the disk array 122 is included in the NAS processor 132, but not limiting to this case, it is also preferable that it is provided in the memory 135, the shared memory 147 or the cache memory 148.

In cooperation with the processing of the application server 232, the I/O driver 233 handles (1) the exchange with the ports 131 of control information or data that are exchanged with the host computer 100, (2) the sending of requests for access to the logical volumes in the disk array 122 or the receiving of read data, (3) the sending of control commands addressed to the backup devices 150 to the I/O processor 133, (4) the receiving of device control information regarding the backup devices 150 from the I/O processor 133, (5) the sending of commands instructing the pairing and unpairing of logical volumes in the disk array 122 to the I/O processor 133, and (6) the sending of backup instruction commands to the I/O processor 133.

The I/O processor 134 in the network adapter includes a disk access request processor 236, a backup instruction command transferer 234, and a logical volume state controller 235. When the disk access request processor 236 has received from the I/O driver 233 in the NAS processor a request for access of a logical volume in the disk array 122, then it executes the writing of data onto the disk array 122 or the reading of data from the disk array 122. More specifically, if the request for access of the logical volume is a write request, then the disk access request processor 236 detects the specified data region of the disk drives 123 using a logical volume-physical device conversion table 247 in the shared memory 147, and stores the write data in the write data region 248 in the cache memory 148 that corresponds to the detected data region. After that, the write data are written into the specified data region in the disk drives 123, under the control by the control processor 145. On the other hand, if the request for access of the logical volume is a read request, then the disk access request processor 236 detects the specified data region of the disk drives 123 using the logical volume-physical device conversion table 247 in the shared memory 147, and finds out whether the requested read data are available in the read data region 249 in the cache memory 148 that corresponds to the detected data region. If the requested read data are stored in the read data region 249, then the disk access request processor 236 reads out the data from the read data region 249, and sends them to the NAS processor 132. If the requested read data are not stored in the read data region 249, then, after the requested read data have been read out into the read data region 249, the disk access request processor 236 reads out the data from the read data region 249, and sends them to the NAS processor 132. Now, if the requested read data are not stored in the read data region 249, then the requested read data are read out from the specified data region in the disk drives 123 to the data read-out region 249 under the control of the control processor 145. And finally, the data that have been read out with the disk access request processor 236 are sent out via the port 131 to the host computer 100 that has requested the read-out, under the control of the NAS processor 132.

The backup instruction command transferer 234 handles the processes that are necessary for backup, such as (1) receiving from the NAS processor 132 control commands that are addressed to the backup devices 150, and transferring them to the backup information storage region 251 in the shared memory 147, (2) retrieving device control information regarding the backup devices 150 from the backup information storage region 251 in the shared memory, and transferring it to the NAS processor 132, (3) receiving backup instruction commands from the NAS processor 132, and, as the target, transferring them to the backup information storage region 251 in the shared memory 147.

The logical volume state controller 235 receives from the NAS processor 132 an instruction command, such as for pairing and unpairing of logical volumes in the disk array 122, and either with or without cooperation with the control processor 145 performs the control of pairing and unpairing. Using a state administration table (not shown in the drawings) of primary logical volumes 223 and secondary logical volumes 224 stored in the shared memory 147, the logical volume state controller 235 performs the control for pairing or unpairing a primary logical volume 223 and secondary logical volume 224 in the disk array 122. The states of the logical volumes that are controlled and managed by the logical volume state controller 235 may be, for example, the following four states: (1) A simplex state, in which no pair of primary logical volume 223 and secondary logical volume 224 is formed. (2) A duplex-pending state, in which after a pair of primary logical volume 223 and secondary logical volume 224 has been formed in response to the control with the logical volume state controller 235, copy formation and copy update are executed or there is the possibility for their execution. It should be noted that "copy formation" here refers to the copying from the primary logical volume 223 to the secondary logical volume 224 that occurs when a copy from the primary logical volume 223 to the secondary logical volume 224 has been started, but the primary logical volume 223 and the secondary logical volume 224 are not yet in a perfect mirror state. On the other hand, "copy update" refers to the copying from the primary logical volume 223 to the secondary logical volume 224 that occurs before the primary logical volume 223 and the secondary logical volume 224 are in a perfect mirror state or after the primary logical volume 223 and the secondary logical volume 224 have assumed a perfect mirror state, in response to the writing of data from the disk access request processor 236 to the primary logical volume 223. (3) A duplex state, in which, after a primary logical volume 223 and a secondary logical volume 224 have formed a pair in response to the control of the logical volume state controller 235, copy formation has been finished and copy update is executed, or there is the possibility for its execution. (4) A split state, after a pair of a primary logical volume 223 and a secondary logical volume 224 has been broken up in response to the control of the logical volume state controller 235, including the state of unpairing.

In this working example, the backup of the data can be performed without affecting the routine processing of the storage system by assigning a disk access request processor 236, a backup instruction command transferer 234 and a logical volume state controller 235 to each of the plurality of I/O processors 133, or by sharing the workloads of a disk access request processor 236, a backup instruction command transferer 234 and a logical volume state controller 235.

The I/O processor 142 in the CHA 140 includes a backup controller 242. The backup controller 242 handles the processes that are necessary for backup, such as (1) retrieving control commands that are stored in the backup information storage region 251 in the shared memory, and sending them out to the backup devices 150 via the port 141 (2) receiving device control information from the backup devices 150 and transferring it to the backup information storage region 251 in the shared memory, and (3) receiving backup instruction commands from the backup information storage region 251 in the shared memory, and, as the initiator, transferring the data in the secondary logical volume 224 to the backup devices 150.

FIG. 3 shows the procedural flow with which the storage system of this working example obtains structural information regarding the backup devices.

First, the application server 232 in the NAS processor generates a control command for confirming the presence of backup devices 150, which is addressed to the I/O processor 142 in the CHA. The control command generated by the application server 232 is sent by the I/O driver 233 to the I/O processor 133 (Step 301). The I/O processor 133 analyzes the content of the control command received from the NAS processor 132, and determines that the control command is addressed to the I/O processor 142 in the CHA. The backup instruction command transferer 234 in the I/O processor 133 transfers the control command to the backup information storage region 251 in the shared memory (Step 302).

The backup controller 242 of the I/O processor in the CHA polls the backup information storage region 251 in the shared memory when necessary, and when it discovers the control command in the backup information storage region 251, it retrieves the control command (Step 303). What is referred to here as polling is the periodic or non-periodic access of memory and inspecting or confirming of information in the memory.

The backup controller 242 in the I/O processor inspects whether backup devices 150 are connected to the ports 141 of the CHA. If, as a result of the inspection, it determines that backup devices 150 are connected, then the backup controller 242 in the I/O processors instructs the backup devices 150 to reveal their WWN (world wide name) (Step 304). In response to this instruction from the backup controller 242 of the I/O processor, the backup devices 150 report their own unique WWNs and the numbers of their ports 151 (Step 305). What is referred to as WWN here is a unique number or the like, with which the backup devices 150 can be identified.

The backup controller 242 of the I/O processor receives the WWNs and the numbers of the ports 151, and creates or updates a mapping table. Here, a mapping table 401 is for example a table as shown in FIG. 4, the details of which are explained later. The backup controller 242 of the I/O processor transfers the information recorded in the mapping table 401 to the backup information storage region 251 in the shared memory (Step 306). The timing of this transfer may be for example concurrent to the creation or updating of the mapping table 401, or it may be subsequent to the creation or the update of the mapping table 401.

The backup instruction command transferer 234 of the I/O processor 133 in the network adapter polls the backup information storage region 251 in the shared memory when necessary, and if it discovers the information that is recorded in the mapping table 401, then it retrieves the information recorded in the mapping table 401 (Step 307). In response to the control command sent out from the NAS processor 132 (Step 301), the backup instruction command transferer 234 of the I/O processor 133 sends the information recorded in the mapping table 401 to the NAS processor 132 (Step 308).

When the application server 232 of the NAS processor receives the information recorded in the mapping table 401 through the I/O driver 233, it creates or updates a mapping table 402. The mapping table 402 has the same content as the mapping table 401, and its details are explained below.

Thus, the application server 232 of the NAS processor can confirm the presence of the backup devices 150.

It should be noted that in this working example, it has been explained that the presence of the backup devices 150 is confirmed from the NAS processor 132, but the present invention is not limited to this example, and it is also preferable that the user or the administrator of the storage system 120 enters the WWNs and the IDs of the ports 151 via the SVP 143. In this case, the I/O processor 142 in the CHA confirm the WWNs and the ports 151 via the SVP to create or update the mapping table 401.

Furthermore, in this working example, the mapping table 401 and the mapping table 402 are respectively stored in the backup controller 242 of the I/O processor 142 in the CHA and the application server 232 of the NAS processor 132 in the network adaptor, but the present invention is not limited to this example, and it is also possible to store them in a backup information storage region 148 of the shared memory, without distinguishing between mapping table 401 and mapping table 402. In this case, the backup controller 242 of the I/O processor 142 in the CHA and the application server 232 of the NAS processor 132 in the network adaptor may access the backup information storage region 148 of the shared memory when necessary.

FIG. 4 shows a mapping table that has been generated through the procedural flow of FIG. 3.

Since the mapping table 401 and the mapping table 402 hold the same content, they are explained without any particular distinction. The mapping tables record the numbers of the ports 141 (referred to as initiator ports in the following) of the CHA 140, the numbers of the ports 151 (referred to as target ports in the following) of the backup devices 150, and the WWNs of the backup devices 150. The numbers of the initiator ports, the numbers of the target ports and the WWNs are recorded in such a manner that their relationship becomes clear.

FIG. 5 shows the procedural flow of the various elements in the storage system for a data input/output request or control command that is sent out by the NAS processor in the storage system.

When the application server 232 in the NAS processor receives a file access request by file designation through the I/O driver 233, it analyzes the content of the file access request. After this analysis, the application server 232 generates an access request for the logical volume in the disk array 122, using the conversion table for requested files and logical volumes in the disk array 122. It should be noted that the relation between files and logical volumes in the conversion table may be a relation that associates one file with one logical volume, a relation that associates one file with a plurality of logical volumes, a relation that associates a plurality of files with one logical volume, or a relation that associates a plurality of files with a plurality of logical volumes.

The request for access to the logical volume is sent by the I/O driver 233 to the I/O processor 133 (Step 501). The request for access to the logical volume may be for example a read request or a write request for that logical volume. The request for access to the logical volume may be for example as shown in FIG. 6, whose details are explained later.

The disk access request processor 236 of the I/O processors analyzes the request for access to the logical volume, and determines whether it is a read request or a write request for the logical volume. Read requests and write requests for the logical volume are processed in the storage system 120 as described above. In response to a read request for a logical volume, the disk access request processor 236 sends out the read data stored in the read data region 249 of the cache memory to the application server 232 of the NAS processor 132 (Step 502). The response to the read request for the logical volume is, for example, as shown in FIG. 6, and its details are explained later. It should be noted that under the control of the application server 232, the read data are sent via the port 131 to the host computer 100 that has requested the read request.

With the process flow shown in FIG. 3, the application server 232 of the NAS processor 132 recognizes that backup devices 150 are connected to the storage system 120. Before preparing itself for a data backup or when the backup of data has become necessary, the application server 232 necessitates device control information regarding the backup devices 150 that are connected to the storage system 120. In this situation, and parallel to the above-described processing of the access request for the logical volume, the application server 232 generates a control command for requesting device control information, addressed to the backup devices 150. The control command generated by the application server 232 is sent by the I/O driver 233 to the I/O processor 133 (Step 503). What is referred to here as device control information is detailed information about the backup devices 150, for example capacity of the storage region, configuration of the logical volumes, capacity of the logical volumes and LUNs or the like. Furthermore, the control command generated by the application server 232 is for example as shown in FIG. 7, and its details are explained later.

The I/O processor 133 analyzes the content of the control command received from the NAS processor 132, and determines that the control command is addressed to the backup devices 150. The backup instruction command transferer 234 in the I/O processor 133 transfers the control command to the backup information storage region 251 in the shared memory (Step 504).

The backup controller 242 of the I/O processor in the CHA from time to time polls the backup information storage region 251 in the shared memory, and when it discovers a control command in the backup information storage region 251, then it retrieves the control command (Step 505). In this situation, the backup controller 242 of the I/O processor judges that the control command, which has a WWN that is recorded in the mapping table 401, is a control command for itself, and retrieves the control command. The backup controller 242 of the I/O processor generates an FCP control command from the retrieved control command. An FCP control command is, for example, the command using FCP shown in FIG. 8, and its details are explained later. The backup controller 242 of the I/O processor references the mapping table 401, and sends out the generated FCP control command to the target port 151 of the backup device 150 through the initiator port 141 (Step 506). As a response to the FCP control command, the backup device 150 sends FCP response information (Step 507). The FCP response information includes the device control information requested by the application server 232 of the NAS processor. The FCP response information is for example the response information using FCP shown in FIG. 9, and its details are explained later.

When the backup controller 242 of the I/O processor receives the response information, it converts it to a control command using SCSI. The backup controller 242 of the I/O processor transfers the converted control command to the backup information storage region 251 in the shared memory (Step 508).

The backup instruction command transferer 234 of the I/O processor 133 in the network adapter polls the backup information storage region 251 in the shared memory from time to time, and if it discovers a control command addressed to the NAS processor 132, it retrieves that control command (Step 509). As a response to the control command sent out by the NAS processor (Step 503), the backup instruction command transferer 234 of the I/O processor 133 sends the control command to the NAS processor 132 (Step 510). The application server 232 of the NAS processor obtains the device control information by analyzing the control command, and from then on administrates the device control information of the backup devices 150. It should be noted that the response to the control command sent from the NAS processor 132 (Step 503) may be for example as shown in FIG. 7, and the details of it are explained later.

In this manner, when the device control information of the backup device 150 has been obtained, the application server 232 of the NAS processor can generate and issue a backup instruction command for the backup device 150 as shown in FIG. 10. It should be noted that FIG. 10 will be explained later.

FIG. 6 is an example of a format for an access request to a logical volume that is sent out by the NAS processor in the storage system.

The access request to a logical volume includes for example a command type field, a serial number ID field of the command, a LUN field for the logical volume to be accessed, a tag information field, an operation code field, a SCSI standard CDB (command descriptor block) field, and reserved fields. Of these, the SCSI standard CDB field is a field that is provided in accordance with the SCSI standard, and stores the logical block address of the logical volume to be written on or read out from. The operation code field is the field where command information, such as the content of the access request, is formulated, and it is a field that can be defined vendor-uniquely. For example, if the access request to the logical volume is a write request, then 2A is stored the operation code field, and if the access request to the logical volume is a read request, then 28 is stored in the operation code field.

By referencing the operation code field, the I/O processor 133 can determine the content of the access request. If the result of referencing the operation code field is that the access request to the logical volume is a write request or a write request, then the disk access controller 233 of the I/O processor references the SCSI standard CDB field, and executes a process in accordance with the content that it has looked up.

Furthermore, if it is a write request, then the write data are stored in the reserved fields. It should be noted that also the response by the I/O processor 133 to the read request for the logical volume has a similar format as access requests to the logical volume, and in this case, the read data are stored in the reserved fields.

FIG. 7 shows an example of the format of a control command for requesting device control information that is sent out from the NAS processor in the storage system. The format of this control command is different than that for data input/output requests, and it is provided with an additional operation code field (a).

In this case, the additionally provided operation code field (a) is a field that stores command information defining that it is a control command for requesting device control information, and it stores, for example, XX. In this case, by referring to the operation code field (a), the I/O processor 133 determines that it is a control command for requesting device control information, and, addressing it to the I/O processor 142 in the CHA, transfers it to the backup information storage region 251 in the shared memory without referring to the SCSI standard CDB field. This is because if the operation code field (a) is provided, then the SCSI standard CDB field stores detailed information that is to be processed by the backup devices 150. On the other side, referencing the information stored in the SCSI standard CDB field, the backup devices 150 determine the content that is requested by the application server 232 in the NAS processor, and execute for example the collection and the sending of the device control information.

In the case of FIG. 7, additional information, such as the initiator port number, the WWN and the LUN, is stored in the reserved fields. The backup controller 242 of the I/O processor in the CHA sends out the above-described FCP control command to the backup devices 150, based on the additional information, such as the initiator port number, the WWN and the LUN.

It should be noted that also the response from the I/O processor 133 to the control command from the NAS processor 132 (Step 503) has the same format as the control command for requesting device control information, and in this case the device control information or the like is further stored in the reserved fields.

FIG. 8 shows the flow of control commands sent out from the NAS processor in the storage system until the commands are received by the backup devices.

As has been mentioned before, the network adapter 130 is one modular board, and the NAS processor 132 and the I/O processor 133 are connected by a bus, such as a PCI bus 134, for example. The exchange of information between the NAS processor 132 and the I/O processor 133 is carried out using SCSI. As shown in FIG. 7, the control commands sent out from the NAS processor 132 include in the operation code field (a) a special operation code 801, defining that it is a control command for requesting device control information. Furthermore, the control commands that are sent out from the NAS processor 132 include information 802 about the SCSI standard CDB as well as other additional information 803. The operation code 801 is deleted after it has been referenced by the I/O processor 133. The information 802 regarding the SCSI standard CDB and the other additional information 803 are stored in the shared memory 147. After the information 802 regarding the SCSI standard CDB and the other additional information 803 have been received by the I/O processor 142 in the CHA 140, the additional information 803 is referenced, and they are sent out, addressed to the backup device 150. For this, the information 802 regarding the SCSI standard CDB and the other additional information 803 are sent out as an FCP control command, using FCP. Thus, the SCSI standard CDB 802 is received by the backup device 150.

FIG. 9 shows the flow of device control information sent out from the backup device until the device control information is received by the NAS processor in the storage system.

The FCP response information storing the device control information is sent out from the backup device 150 to the I/O processor 142 in the CHA 140 using FCP. For this, the backup device 150 sends out an FCP_XFER_RDY command, an FCP_DATA command and an FCP_RSP command to the I/O processor 142. The FCP_XFER_RDY command fulfills the role of negotiation between the backup device 150 and the I/O processor 142. More specifically, the backup device 150 relays a confirmation response that the FCP conversion (XFER) can be started (RDY) to the I/O processor 142. The FCP_DATA command is appended as a parameter 903 to the device control information. In the FCP_RSP command, information related to the SCSI standard CDB 802 is appended as SCSI STATUS 904. The FCP_DATA command and the FCP_RSP command are converted by the I/O processor 142 into SCSI commands for the parameter 903 and the SCSI STATUS 904. The parameter 903 and the SCSI STATUS 904 are transferred to the shared memory 147. The parameter 903 and the SCSI STATUS 904 are retrieved from the shared memory 147 by the I/O processor 133 in the network adapter 130, and are converted into response control information of the format shown in FIG. 7. For this, the device control information is stored in the reserved fields. After that, the response control information is sent out by the I/O processor 133 to the NAS processor 132. Thus, the device control information is received by the NAS processor 132.

FIG. 10 shows the procedural flow when storing data in the storage system in the backup devices.

When there has been an instruction to back up file data from a host computer 100 (Step 1001), then, in order to acquire the state of the logical volume on which the data to be backed up are stored, the application server 232 of the NAS processor sends out a state request for that logical volume to the I/O processor 133 (Step 1002). For this, the application server 232 acquires information about the data in the logical volume by accessing the control information in the memory 135, and using the conversion table for conversion between file table and logical volumes in the disk array 122, acquires information about the data in the logical volume corresponding to the file data to be backed up (in the following, this is referred to as "data to be backed up in the logical volume"). The application server 232 attempts to acquire the state for the logical volume, which is included in the acquired data. The I/O processor 133 receives the state request for the logical volume via the I/O driver 233 and the PCI bus 134. The logical volume state controller 235 of the I/O processor references the logical volume state administration table 252 in the shared memory 147, and acquires the state of the logical volume in which the data to be backed up are stored (Step 1003). What is referred to here as state of the logical volume is, as already explained before, for example simplex state, duplex-pending state, duplex state and split state. The logical volume state controller 235 of the I/O processor sends out the acquired logical volume state response to the application server 232 of the NAS processor (Step 1004). If the result of analyzing the content of the logical volume state response is that the logical volume is in the simplex state, then the application server 232 of the NAS processor generates a pair formation instruction command, and sends it out to the I/O processor 133 (Step 1005). Using the SVP 143 or the host computers 100, the user or administrator has previously specified the logical volume on which the data to be backed up are stored (this logical volume is referred to as "primary logical volume") and the logical volume on which a copy of the backup data is stored (this logical volume is referred to as "secondary logical volume"). The application server 232 of the NAS processor generates a pair formation instruction command that is supposed to form a pair of the primary logical volume and the secondary logical volume, and that includes related information, such as the LUNs of the primary logical volume and the secondary logical volume. The logical volume state controller 235 of the I/O processor analyzes the content of the received pair formation instruction command, and stores the related information, such as the LUNs of the primary logical volume and the secondary logical volume of which a pair is to be formed, in a logical volume state control table 253 in the shared memory 147 (Step 1006). Then, the control processor 145 references for example the logical volume state control table 253 and the logical volume-physical device conversion table 247 in the shared memory 147, and forms a pair. The control processor 145 stores in the logical volume state administration table 252 in the shared memory 147 the fact that a pair has been formed and has assumed the duplex-pending state. The control processor 145 also stores in the logical volume administration table in the shared memory 147 the fact that the duplex state has been assumed after the duplex-pending state has been ended. The logical volume controller 235 of the I/O processor from time to time polls the logical volume administration table of the shared memory 147, and when it confirms that the logical volume corresponding to the pair formation instruction command has taken on the duplex state (Step 1007), then it sends the response to the pair formation instruction command to the application server 232 of the NAS processor (Step 1008). After the application server 232 of the NAS processor has confirmed that the duplex state has been assumed, it sends out a split request to the I/O processor 133 (Step 1009).

If the result of analyzing the content of the state response of the logical volume (Step 1004) is that the logical volume is in the duplex-pending state, then the application server 232 of the NAS processor generates a copy formation end inspection command and sends it to the I/O processor 133 (Step 1010). The logical volume state controller 235 of the I/O processor analyzes the content of the received copy formation end inspection command, and inspects whether the copy formation of the logical volume in the duplex-pending state has ended. More specifically, the logical volume state controller 235 of the I/O processor inspects the logical volume state administration table 252 in the shared memory and keeps waiting that the duplex-pending state turns into the duplex state. When the logical volume state controller 235 of the I/O processor confirms that the logical volume has assumed the duplex state (Step 1007), it sends out a copy formation end confirmation command to the application server 232 of the NAS processor (Step 1011). After the application server 232 of the NAS processor has determined that a pair has been formed, it sends out a split request to the I/O processor 133 (Step 1009).

If the result of analyzing the content of the state response of the logical volume (Step 1004) is that the logical volume is in the duplex state, then the application server 232 of the NAS processor sends out a split request to the I/O processor 133.

It should be noted that if the result of analyzing the content of the state response of the logical volume (Step 1004) is that the logical volume is already in the split state, then there is no need for the application 232 of the I/O processor 133 to send out a new split request.

When the logical volume state controller 235 of the I/O processor receives the split request, it analyzes the content of the received split request, and stores related information, such as the LUNs of the primary logical volume and the secondary logical volume to be split, in the logical volume state control table 253 in the shared memory 147 (Step 1012). The control processor 145 references the logical volume state control table 253 and the logical volume-physical device conversion table 247 in the shared memory 147, and ends the copy update of the pair in the duplex state. By ending the copy update, the pair of logical volumes becomes separated. The control processor 145 stores the fact that the pair has been separated and is now in the split state in the logical volume state administration table 252 in the shared memory 147. The logical volume controller 235 in the I/O processor from time to time polls the logical volume administration table in the shared memory 147 and when it confirms that the pair of logical volumes corresponding to the split request have assumed the split state (Step 1013), then it sends out a split complete command to the application server 232 of the NAS processor (Step 1014).

After the application server 232 of the NAS processor has received the split completion command, it generates a backup instruction command and a parameter list, and, taking the I/O driver 233 as the initiator of the backup instruction command, sends it out to the I/O processor 133 (Step 1015). The application server 232 includes in the parameter list information regarding the data to be backed up in the logical volume.

Via the I/O driver 233 and the PCI bus 134, the I/O processor 133 receives the backup instruction command and the parameter list following the same. The backup instruction command starts the execution of the job serving as the target in the backup instruction command transferer 234 of the I/O processor. The backup instruction command transferer 234 of the I/O processor transfers the backup instruction command and the parameter list to the backup information storage region 251 in the shared memory, as the target of the backup instruction command (Step 1016).

The backup controller 242 of the I/O processor 142 in the CHA discovers the backup instruction command and the parameter list by polling the shared memory 147 from time to time. The backup controller 242 of the I/O processor retrieves the backup instruction command and the parameter list from the backup information storage region 251 in the shared memory (Step 1017). By referencing the content of the parameter list, the backup controller 242 of the I/O processor decides that the target port 151 of the backup devices is used as the target for performing the backup of the data. Via the initiator port 141, the backup controller 242 of the I/O processor confirms whether the data port 151 of the backup devices 150 is usable (Step 1018). In response to the confirmation by the backup controller 242 of the I/O processor, the backup device 150 replies with detailed information about the target port addressed to the backup controller 242 of the I/O processor (Step 1019). The backup controller 242 of the I/O processor logs into the backup device 150 through the target port 151 (Step 1020). The backup controller 242 of the I/O processor sends an FCP write command (FCP CMND (WRITE)) with the initiator port 141 to the target port 151 of the backup device 150 (Step 1021). Then, the backup device 150 replies with FCP XFER RDY, which indicates that it can receive the conversion of data (Step 1022).

The backup controller 242 of the I/O processor references the content of the parameter list retrieved from the shared memory 147, and stores the read request for the data to be backed up in the logical volume to the backup information storage region 251 in the shared memory (Step 1023). The control processor 145 references the data read request stored in the backup information storage region 251 in the shared memory, and reads out the requested data into the backup read data region 250 of the cache memory 148. What is referred to here as data read out into the cache memory 148 are the data that are stored in the secondary logical volume of the pair of logical volumes confirmed to be in a split state in Step 1013. By backing up the data stored in the secondary logical volume, it becomes possible for the host computer 100, the NAS processor 132 and the I/O processor 133 to execute access requests and other processes with respect to the primary logical volume. The backup controller 242 of the I/O processor from time to time retrieves the data stored in the backup read data region 250 of the cache memory 148, converts them to FCP, and sends out the converted FCP data to the backup device 150 (Step 1024).

When the backup device has received the backup data, it responds with an FCP response (RSP) that indicates that the receiving of data has been successful (Step 1025).

Subsequently, the backup controller 242 of the I/O processor, the backup device 150 and the shared memory 147 continue the processing of the Steps 1021 to 1025. This processing is reiterated until the backup of all data specified by the parameter list retrieved from the shared memory 147 has been performed. When the backup controller 242 of the I/O processor has received the FCP response (Step 1025) for the final FCP data, it stores a backup completion notice to the backup information storage region 251 in the shared memory (Step 1026).

By polling the shared memory from time to time, the backup command transferer 234 of the I/O processor in the network adapter discovers this backup completion notice. The backup command transferer 234 of the I/O processor retrieves the backup completion notice from the backup information storage region in the shared memory (Step 1027), and generates a backup instruction command completion notice indicating that the instruction content of the backup instruction command has been completed, and sends this notice to the NAS processor 132 (Step 1028).

With the above process, the backup of data is completed, and the application server 232 of the NAS processor notifies the host computer 100 of the appropriate completion of the backup (Step 1029). Now, when the backup of the data has been completed, the user or administrator issues an unpairing instruction using the SVP 143 or the host computer 100. The application server 232 of the NAS processor unpairs the pair in response to the instruction from the SVP 143 or the host computer 100. By unpairing the pair, also the distinction between primary logical volume and secondary logical volume is lost, and correspondingly, the state information in the logical volume state administration table 252 is updated to simplex state.

Furthermore, when the backup of data has been completed, the user or administrator may instruct the reforming (restoring) of pairs using the SVP 143 or a host computer 100. The application server 232 of the NAS processor restores a pair in response to an instruction from the SVP 143 or a host computer 100. By restoring a pair, a pair of primary logical volume and secondary logical volume is restored, and correspondingly, also the state information in the logical volume state administration table 252 is updated to the duplex-pending state. In this case, the data of the primary logical volume that was updated during the split state (update differential data) is administrated in an update differential data administration table (not shown in the drawings) in the shared memory 147, and the update differential data are copied to the secondary logical volume for copy formation.

Thus, the data to be backed up in the logical volume of the storage system 120 are copied to the backup device 150, and the file data instructed by the host computer (Step 1001) are backed up in the backup device 150.

It should be noted that in this working example, if the content of the state response (Step 1004) of the logical volume is that it is in the simplex state, then split processing is performed through the pair formation instruction command (Step 1005), the response thereto (Step 1008) and the split request (Step 1009), but the present invention is not limited to this example, and it is also preferable that the logical volume state controller 235 of the I/O processor is caused to perform the processing corresponding to all commands, including a pair formation instruction command (Step 1005), the response thereto (Step 1008) and a split request (Step 1009), with one collective command from the NAS processor 132.

Furthermore, with this working example, if the content of the state response (Step 1004) of the logical volume is that it is in the duplex-pending state, then split processing is performed through a copy formation end inspection command (Step 1010), a copy formation end confirmation command (Step 1011), and a split request (Step 1009), but the present invention is not limited to this example, and it is also preferable that the logical volume state controller 235 of the I/O processor is caused to perform the processing corresponding to all commands, including a copy formation end inspection command (Step 1010), a copy formation end confirmation command (Step 1011), and a split request (Step 1009), with one collective command from the NAS processor 132.

Furthermore, in this working example, after a pair of logical volumes has been formed and split, the data stored in the secondary logical volume are backed up, but the present invention is not limited to this example, and it is also preferable that the data stored in the primary logical volume are backed up without creating a secondary volume. In this case, the data read out into the backup read data region 250 of the cache memory 148 by the control processor 145 are the data that are stored in the primary logical volume.

Furthermore, in this working example, the NAS processor 132 requests the state of the logical volume (Step 1002) due to the backup instruction from the host computer 100 (Step 1001), but the present invention is not limited to this example, and it is also preferable that backup times are previously set in internal devices in the storage system 120, such as the NAS processor 132, so that the NAS processor 132 requests the state of the logical volume (Step 1002) at those preset backup times. In that case, it is preferable that the processing of Step 1001 through Step 1014 has already been finished at the preset backup times, so that the backup of data at the preset backup times is possible.

In this working example, the NAS processor 132 performs all necessary pre-processing up to the split request (Step 1009) in response to the state of the logical volume, so that the backup can be migrated efficiently to the backup devices 150, regardless of the state of the logical volume when instructing a backup with a host computer.

Furthermore, in this working example, when the I/O processor 142 of the CHA 140 is processing the backing up of data to the backup devices 150, the I/O processor 133 of the network adapter 130 can process disk access requests, so that the processing of backing up data to the backup devices 150 can be executed without affecting the processing of disk access requests.

Furthermore, in this working example, backup is carried out with a special instruction command from the NAS processor 132 of the network adapter 130, so that the process of backing up data to the backup devices 150 can be executed without step-by-step control and instructions from outside the storage system 120.

Furthermore, in this working example, it is possible to execute the process of backing up data to the backup devices 150 connected to the CHA 140 via the SAN 180, so that the process of backing up data to the backup devices 150 can be executed without affecting the traffic on a LAN connected to the network adapter 130.

FIG. 11 is an example of a backup instruction command that is sent out after it has been generated by the NAS processor in the storage system.

The backup instruction command in this working example is a command for copying data from the storage system 120 serving as source device to the backup devices 150 serving as destination devices, based on the parameter list shown in FIG. 12.

An example of the backup instruction command is for example the extended copy command. What is referred to here as extended copy command is a SCSI primary command or a vendor-unique command. The format of the extended copy command is given by "Draft SCSI Primary Commands-2 (SPC-2)," T10/1236-D, rev. 19, Mar. 2, 2001 (internal working documentation of T10 of the Technical Committee of Accredited Standards Committee NCITS (National Committee for Information Technology Standards), published on T10's website www.t10.org and the American National Standards Institute, New York, N.Y.), which is incorporated by reference in the specification of this application. Extended copy commands are 16 bits wide and 16 bits long. The parameter list length is the information about the length of the parameter list in bytes. The initiator and the target of the backup copy of the actual data is given by the parameter list that follows after the extended copy command.

FIG. 12 is an example of the parameter list that follows after the backup instruction command of FIG. 11.

The parameter list includes information regarding (1) which I/O processor 133 in the network adapter is taken as the target of the backup instruction command, (2) which I/O processor 142 in the CHA is used as the initiator for performing the backup of data, (3) which target port 151 of the backup devices serves as the target for performing the backup of the data, and (4) information regarding the data to be backed up in the logical volume.

The format of the parameter list is the format of SPC-2 (referred to as SPC-2 parameter list in the following). The SPC-2 parameter list is 16 bits wide. A characteristic of the SPC-2 parameter list is the inline data length of four bytes at bytes 12 to 15 and the target descriptors 0 at bytes 16 to 47. The target descriptors 0 have a fixed length (32 bytes) and have an initial byte (byte 16) of "E0" (hexadecimal E0h). The target descriptors express for example a WWN that uniquely identifies a SCSI device port. The target descriptors are a list of the devices en route from the copy source of the data to the copy destination of the data. The segment descriptors are for example information that is associated with the devices expressed by a plurality of target descriptors.

In this working example, the target descriptor 0 is the device type of the I/O processor 133. The target descriptor 1 specifies the device type of the I/O processor 142 in the CHA and the LUN "A" indicating the logical volume in the disk array, and the target descriptor N specifies the target port 151 of the backup devices and the LUN "B" indicating the logical volume in the backup device 150. Moreover, the segment descriptor 0 specifies that the target descriptor 0 and the target descriptor 1 are associated. The segment descriptor 1 specifies that the target descriptor 1 and the target descriptor N are associated, and that the backup of data is executed.

Furthermore, the parameter list includes information regarding the data to be backed up in the logical volume. The information regarding the data to be backed up in the logical volume is specified for example as inline data. By including information regarding the data to be backed up in the logical volume in the parameter list, the I/O processor 142 of the CHA 140 can confirm the data to be backed up in the logical volume based on the parameter list generated by the NAS processor 132, and can make a backup copy, on the backup device 150, of the data to be backed up in the logical volume. Thus, the file data instructed from the host computer (Step 1001) are backed up on the backup device 150.

It should be noted that this working example has been explained for the case that the I/O processor 142 in the CHA can access the target devices 150 in each one of FIG. 3, FIG. 5 and FIG. 10, but there may also be cases in which it cannot access the target devices 150. In such cases, the NAS processor 132 receives an error message from the I/O processor 142 in the CHA via the shared memory 147 and the I/O processor 133 in the network adapter. Examples of such cases are that the target devices 150 cannot be utilized, there is no SAN connection that can be utilized, or that the port 151 of the target device is currently in use.

Furthermore, in this working example, it was stated that the I/O processor 133 and the I/O processor 142 discover information in the shared memory 147 by polling, but the present invention is not limited to this method, and it is also preferable that the I/O processor 133 and the I/O processor 142 discover information in the shared memory 147 by other methods. Examples of other methods are that the I/O processor 133 and the I/O processor 142 inform one another by communication of the fact that information has been stored in the shared memory 147. For example, in Step 302 and Step 303, the backup instruction command transferer 234 of the I/O processor 133 transfers the control command to the backup information storage region 251 in the shared memory, whereas the fact that the control command has been transferred to the shared memory 147 is notified to the backup controller 242 of the I/O processor 142. When the backup controller 242 receives this notice, it replies to the backup instruction command transferer 234 that it has received the notice, and retrieves the control command by accessing the shared memory 147.

Furthermore, this working example has been explained for the case that the CHA 140 and the backup device 150 are connected to one another using one port, but the present invention is not limited to this example, and can also be applied to cases in which the CHA 140 and the backup device 150 are connected using a plurality of ports. In this case, a plurality of I/O processors 142 corresponding to a plurality of ports in the CHA may be provided, and it is preferable that the I/O processor of the plurality of I/O processors 142 that discovers certain information first in the shared memory 147 performs the backup process in accordance with that discovered certain information. The I/O processor 142 that has discovered the certain information may control other I/O processors 142 such that the backup process is handled jointly by a plurality of I/O processors 142, thus making it possible to perform the backup of data even faster.

Furthermore, this working example has been explained for the case that the network adapter 130 is not connected to the backup device 150, but the present invention is not limited to this example, and can also be applied to cases in which the network adapter 130 is connected to the backup device 150 via a port 131. In that case, the network adapter 130 also has the functions of the CHA 140 in this working example. More specifically, it is also preferable that while retaining the configuration of the network adapter 130 and the CHA shown in FIG. 1, they are arranged as one board or one module, and it is also preferable that the NAS processor 132 or the I/O processor 133 in the network adapter 130 are provided with the functions of the I/O processor 142 in the CHA 140.

Moreover, in this working example, it has been explained that if the NAS processor 132 is provided in the DKC 121 and the storage system 120, then the NAS processor 132 receives the device control information, but the present invention is not limited to this example, and can also be applied to cases in which the NAS processor 132 is not provided in the DKC 121 and the storage system 120, as long as using a device that has the same functions as the NAS processor 132, a device that has the same functions as the I/O processor 133, a device that has the same functions as the shared memory 147, and a device that has the same functions as the I/O processor 142.

Furthermore, this working example has been explained for the case of data backup in a NAS, but the present invention is not limited to this example, and can also be applied without changes to cases in which a device that has the same functions as the NAS processor 132, a device that has the same functions as the I/O processor 133, a device that has the same functions as the shared memory 147, and a device that has the same functions as the I/O processor 142 are present via a SAN. Furthermore, it can also be applied without changes to cases in which the host computers 100, the DKC 121 and the disk array 122 etc. of this working example are present via a SAN. Also in this case, this working example can achieve efficient and speedy backup of data without using a backup server.

Furthermore, this working example may also have a plurality of network adapters 130, a plurality of CHAs 140 and a plurality of DKA 149 in the DKC 121, so that there may be conflicts when accessing the shared memory 147 or the cache memory 148 from the plurality of network adapters 130, the plurality of CHAs 140 or the plurality of DKA 149. Even when there is access to the shared memory 147 or the cache memory 148 from a plurality of processors among the plurality of network adapters 130, the plurality of CHAs 140 or the plurality of DKA 149, then there are no access conflicts if the plurality of processors access mutually different addresses, different information or different data, so that in this case no exclusive control is necessary. And similarly, also when the access from the plurality of processors is for reading information or data, then the consistency of the information or data will not be lost, so that there is not need for exclusive control or the like. However, if a plurality of processors access the same address, the same information or the same data or the like, and if the access of the plurality of processors is for writing information or data, then it is necessary to achieve consistency of the information or data, so that it is preferable that that processor of the plurality of processors that has first accessed the shared memory 147 or the cache memory 148 temporarily retains the exclusive right to write into the shared memory 147 or the cache memory 148. In that case, lock bits are provided at individual addresses in the shared memory 147 or the cache memory 148, and the processor with the first write access changes the lock bit in that address from "0" to "1," thereby obtaining the exclusive right to write. Other processors that access the same address afterwards read out the lock bit in that address and recognize that it is "1," thereby understanding that another processor has already acquired the exclusive right to write. Thus, other processors cannot write into addresses for which the lock bit is "1."

This working example has been explained for the case that the storage system 120 is connected to the backup devices 150 via a SAN 180, but the present invention is not limited to this example, and it is also preferable that the storage system 120 is connected via the SAN 180 to another storage system or any other information processing system. In that case, the I/O processor 142 of the CHA 140 transfers data via the SAN to that other information processing system. Also in this case, a SAN-NAS integrated storage system can be realized with the present working example.

Furthermore, this working example was explained for the case that the primary volumes 223 and the secondary volumes 224 correspond to one another in a one-to-one relationship, but the present invention is not limited to this example, and can also be applied to cases in which the primary volumes 223 and the secondary volumes 224 correspond to one another in a one-to-N relationship.

Furthermore, in this working example, the host computers 100 and the storage system 120 are connected via a LAN 160, but the present invention is not limited to this example, and it can also be applied to cases in which the host computers 100 and the storage system 120 are connected via a WAN (wide area network), the Internet, a VPN (virtual private network), a SAN or a public communications network.

Furthermore, this working example was explained for the case that the shared memory 147 and the cache memory 148 are arranged physically and functionally separate from one another, but the present invention is not limited to this example, and it is also preferable that a memory is used that integrates functions corresponding to those of the shared memory 147 and the cache memory 148.

Furthermore, in this working example, the I/O processor 133 was provided with a disk access request processor 236 and a logical volume state controller 235, but the present invention is not limited to this example, and it is also preferable that the NAS processor 132 is provided with disk access request processor 236 and a logical volume state controller 235.

Furthermore, in this working example there is no limitation to the NAS processor 132, the I/O processor 133 and the I/O processor 142 of this working example, and it also includes hardware, software or programs having similar functions as the NAS processor 132, the I/O processor 133 and the I/O processor 142.

What is claimed is:

1. A storage system comprising:
   a storage device storing data;
   a network adapter including a first port connected to a communication path, and a first processor that is connected to said first port, and that is configured to receive a file access request via said communication path and give commands to access the data stored in said storage device as well as to back up said data stored in said storage device;
   a channel adapter including a second port connected to a device storing backup data, and a second processor that is connected to said second port, and that is configured to send out said data stored in said storage device via said second port to said device storing backup data in response to receiving from said first processor a backup command;
   a disk adapter configured to access data stored in said storage device; and
   a connection mechanism by which said network adapter, said channel adapter, and said disk adapter are connected,
   wherein said first processor is further configured to receive from an external device a backup command, and in response thereto to perform a split operation on a logical volume on which said data is stored, and then to send to said device storing backup data an instruction to back up the data.

2. The storage system according to claim 1, wherein said first processor is further configured to perform a pair formation operation on said logical volume prior to performing said split operation when said logical volume is in a simplex state.

3. The storage system according to claim 1, wherein said first processor is further configured to perform a copy-formation-end operation on said logical volume prior to performing said split operation when said logical volume is in a duplex-pending state.

4. The storage system according to claim 1, wherein said network adapter further includes a third processor configured to receive an access to data stored in said storage device instructed from said first processor, to receive from said first processor the instruction to back up the data, and to transfer the instruction to back up the data via said connection mechanism.

5. The storage system according to claim 2, wherein said second processor is configured to retrieve the instruction to back up the data via said connection mechanism, and carry out a process in response to said backup instruction.

6. The storage system according to claim 1, wherein said first processor is configured to address said second processor to confirm that the device that stores the backup data is connected to said second port.

7. The storage system according to claim 3, wherein said network adapter further includes a third processor configured to receive an access to data stored in said storage device instructed from said first processor, to receive from said first processor a confirmation request for confirming that the device in which the backup data are stored is connected to said second port, and to transfer the request via said connection mechanism.

8. The storage system according to claim 4, wherein said second processor is configured to receive the confirmation request for confirming that the device in which the backup data are stored is connected to said second port, and determine whether the device in which the backup data are stored is connected via said second port.

9. The storage system according to claim 1, wherein said first processor is configured to address said second processor to request structural information about the device in which the backup data are stored.

10. The storage system according to claim 6, wherein said network adapter further includes a third processor configured to receive an access to data stored in said storage device instructed from said first processor, to receive from said first processor a request for structural information regarding the device in which the backup data are stored, and to transfer the request via said connection mechanism.

11. The storage system according to claim 7, wherein said second processor is configured to receive the request from said first processor for structural information regarding the device in which the backup data are stored, and, via said second port, request structural information from the device in which the backup data are stored.

12. The storage system according to claim 1, wherein said network adapter further includes a third processor configured to receive an instruction for backup of the data from said first processor and transfer the instruction for backup of the data via said connection mechanism; and wherein said first processor and said third processor are configured to exchange information using SCSI.

13. The storage system according to claim 1, wherein said network adapter is a single board, includes a third processor configured to receive an instruction for backup of the data from said first processor and transfer the instruction for backup of the data via said connection mechanism.

14. The storage system according to claim 1, wherein said network adapter further includes a third processor configured to receive an instruction for backup of the data from said first processor and transfer the instruction for backup of the data via said connection mechanism; and wherein said first processor and said third processor are connected by a bus.

15. A data backup method comprising:
receiving from a network adapter with a first port connected to a communication path an instruction to create a duplicate of data stored in a storage device;
receiving from the network adapter an instruction, after a duplicate of said data has been created, to send the created duplicate of the data to a backup device;
performing a split operation on a logical volume on which is stored the data to be duplicated;
providing to a channel adapter with a second port connected to the backup device the instruction for sending the created duplicate of the data to said backup device; and
providing to said channel adapter the created duplicate of data to be sent via said second port to said backup device.

16. The storage system according to claim 15, further including performing a pair formation operation on said logical volume prior to performing said split operation when said logical volume is in a simplex state.

17. The storage system according to claim 15, further including performing a copy-formation-end operation on said logical volume prior to performing said split operation when said logical volume is in a duplex-pending state.

18. The data backup method according to claim 15, further comprising:
receiving from said network adapter a request for confirmation that said backup device is connected to said second port;
providing to said channel adapter said confirmation request, wherein said channel adapter is configured to confirm via said second port whether said backup device is connected or not; and
receiving from said network adapter the instruction to send to said backup device.

19. The data backup method according to claim 15, further comprising:
receiving from said network adapter a request for structural information of said backup device; and
providing to said channel adapter said request for structural information, wherein said channel adapter is configured to request said structural information via said second port from said backup device, and after said backup device has made a response regarding the request for structural information, to give the instruction to send to said backup device.

20. A storage system comprising:
a first path including a first port that is connected to a communication path and that receives a file access request, and a storage device that stores data corresponding to the file access request; and
a second path including a channel adapter that receives a backup instruction for backing up data stored in said storage device from a network adapter including said first port, and a second port that, in response to said backup instruction, transfers the data stored in said storage device to a backup device connected to said channel adapter,
wherein a split operation is performed on a logical volume on which data to be backed up is stored.

21. The storage system according to claim 20, wherein a pair formation operation is performed on said logical volume prior to performing said split operation when said logical volume is in a simplex state.

22. The storage system according to claim 20, wherein a copy-formation-end operation is performed on said logical volume prior to performing said split operation when said logical volume is in a duplex-pending state.

* * * * *